(12) United States Patent
Jung et al.

(10) Patent No.: US 11,943,378 B2
(45) Date of Patent: Mar. 26, 2024

(54) CAMERA BRACKET INCLUDING AUDIO SIGNAL PATH AND ELECTRONIC DEVICE INCLUDING THE CAMERA BRACKET

(71) Applicant: Samsung Electronics Co., Ltd., Gyeonggi-do (KR)

(72) Inventors: Jaehong Jung, Gyeonggi-do (KR); Gyeongtae Kim, Gyeonggi-do (KR); Yongseok Lee, Gyeonggi-do (KR); Jinman Kim, Gyeonggi-do (KR); Souksu Jang, Gyeonggi-do (KR); Hyeyeong Choi, Gyeonggi-do (KR); Jiwoo Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/136,447

(22) Filed: Apr. 19, 2023

(65) Prior Publication Data
US 2023/0254391 A1 Aug. 10, 2023

Related U.S. Application Data

(63) Continuation of application No. 17/872,101, filed on Jul. 25, 2022, now Pat. No. 11,641,415, which is a (Continued)

(30) Foreign Application Priority Data

Aug. 1, 2019 (KR) .......................... 10-2019-0093859

(51) Int. Cl.
*G06F 1/16* (2006.01)
*G03B 17/56* (2021.01)
(Continued)

(52) U.S. Cl.
CPC ........ *H04M 1/0264* (2013.01); *G03B 17/561* (2013.01); *H04N 23/51* (2023.01)

(58) Field of Classification Search
None
See application file for complete search history.

(56) References Cited

U.S. PATENT DOCUMENTS 7,228,158 B2 * 6/2007 Lee ..................... H04M 1/0216
379/433.02
7,614,803 B2 * 11/2009 Takeuchi ............... G03B 17/02
396/419

(Continued)

FOREIGN PATENT DOCUMENTS

CN 110995907 A 4/2020
KR 10-2014-0050912 A 4/2014
(Continued)

OTHER PUBLICATIONS

Notice of Allowance dated Oct. 18, 2023.

*Primary Examiner* — Tuan A Tran
(74) *Attorney, Agent, or Firm* — Cha & Reiter, LLC

(57) ABSTRACT

An electronic device is disclosed herein. The device includes a housing including a first opening formed in a surface thereof, a camera at least partially disposed in the housing, such that a lens of the camera is aligned with the first opening, a camera bracket including a flange structure disposed in the housing and spaced apart from the surface of the housing at a predetermined interval, a protruding structure extending from the flange structure into a space defined between the camera and an inner wall of the first opening to surround at least part of the camera, wherein the flange structure includes a first through-hole, and the protruding structure includes a recess, and wherein the protruding structure and the inner wall of the first opening form a microphone hole in communication with the recess and part (Continued)

of the first opening, an adhesive member disposed between the flange structure and an inner surface of the housing, the adhesive member including a passage, wherein one side of the passage is connected to the recess, and an opposite side of the passage is connected to the first through-hole, and a microphone element disposed in the housing and aligned with the first through-hole.

20 Claims, 12 Drawing Sheets

Related U.S. Application Data continuation of application No. 16/944,557, filed on Jul. 31, 2020, now Pat. No. 11,399,085.

(51) Int. Cl.
  *H04M 1/02* (2006.01)
  *H04N 23/51* (2023.01)
  *H04R 1/08* (2006.01)
  *H05K 13/00* (2006.01)

(56) References Cited

U.S. PATENT DOCUMENTS

| | | | |
|---|---|---|---|
| 7,801,571 B2 | 9/2010 | Friedman et al. | |
| 8,385,060 B2 * | 2/2013 | Dabov | G06F 1/181 361/679.55 |
| 8,896,754 B2 * | 11/2014 | Mundt | G03B 11/043 348/207.99 |
| 9,030,817 B2 * | 5/2015 | Dabov | H04R 31/00 361/679.01 |
| 9,179,055 B2 * | 11/2015 | Hooton | H04M 1/026 |
| 9,326,057 B2 | 4/2016 | Lee | |
| 9,545,764 B2 * | 1/2017 | Allore | H04M 1/0252 |
| 9,571,708 B2 * | 2/2017 | Haddad | G03B 9/08 |
| 9,616,625 B2 * | 4/2017 | Allore | B29C 45/14778 |
| 9,974,199 B2 * | 5/2018 | Allore | G06F 1/1637 |
| 9,999,149 B2 | 6/2018 | Jun et al. | |
| 10,075,572 B2 * | 9/2018 | Gifford | G06F 8/65 |
| 10,215,742 B2 | 2/2019 | Choi et al. | |
| 10,257,333 B2 | 4/2019 | Kim et al. | |
| 10,294,016 B2 * | 5/2019 | Rayner | H04N 5/2252 |
| 10,356,500 B2 | 7/2019 | Kim | |
| 10,524,552 B2 * | 1/2020 | Okada | H04B 1/3888 |
| 10,701,469 B2 | 6/2020 | Park et al. | |
| 10,705,568 B2 * | 7/2020 | Dabov | G06F 1/1637 |
| 10,708,397 B2 * | 7/2020 | Gifford | H04M 1/0264 |
| 10,708,472 B2 * | 7/2020 | Jeong | H04N 5/2252 |
| 11,039,048 B2 * | 6/2021 | Jeong | H05K 1/144 |
| 11,212,427 B2 * | 12/2021 | Jeong | H04N 7/186 |
| 2007/0123312 A1 | 5/2007 | Friedman et al. | |
| 2014/0112518 A1 | 4/2014 | Lee | |
| 2015/0219608 A1 | 8/2015 | Choi et al. | |
| 2017/0251564 A1 | 8/2017 | Jun et al. | |
| 2018/0241861 A1 | 8/2018 | Kim et al. | |
| 2019/0037293 A1 | 1/2019 | Kim | |
| 2019/0320253 A1 | 10/2019 | Park et al. | |
| 2020/0107446 A1 | 4/2020 | Maki | |
| 2020/0394882 A1 * | 12/2020 | England | H04N 7/186 |

FOREIGN PATENT DOCUMENTS

| | | |
|---|---|---|
| KR | 10-2018-0051983 A | 5/2018 |
| KR | 10-2018-0096178 A | 8/2018 |
| KR | 10-2021-0101462 A | 8/2021 |
| WO | 2018/171887 A1 | 9/2018 |

* cited by examiner

CAMERA BRACKET INCLUDING AUDIO SIGNAL PATH AND ELECTRONIC DEVICE INCLUDING THE CAMERA BRACKET

CROSS-REFERENCE TO RELATED APPLICATION(S)

This application is a Continuation of U.S. patent application Ser. No. 17/872,101 filed on Jul. 25, 2022, which is a continuation of U.S. patent application Ser. No. 16/944,557, filed on Jul. 31, 2020 and assigned U.S. Pat. No. 11,399,085 issued on Jul. 26, 2022, and claims priority under 35 U.S.C. § 119 to Korean Patent Application No. 10-2019-0093859, filed on Aug. 1, 2019, in the Korean Intellectual Property Office, the disclosure of which is incorporated by reference herein its entirety.

BACKGROUND

1. Field

The disclosure relates to an electronic device equipped with a camera, and more particularly, to a camera-equipped electronic device utilizing a camera bracket including an audio signal path.

2. Description of Related Art

An electronic device may include a plurality of microphone elements disposed therein to receive audio origination from a variety of directions. The electronic device may include audio signal paths extending in different directions in the body of the electronic device. The audio signal paths may be connected to the plurality of microphone elements, respectively, to receive audio in various directions.

To receive audio in a direction matching capture of a photo by a camera, the electronic device may include an audio signal path extending from an area including the camera to an area including a microphone element in the electronic device.

The above information is presented as background information only to assist with an understanding of the disclosure. No determination has been made, and no assertion is made, as to whether any of the above might be applicable as prior art with regard to the disclosure.

SUMMARY

The audio signal path may include a microphone hole disposed in a part of the camera area. The microphone hole may sometimes be formed in a housing and positioned between a plurality of cameras. However, this may degrade the aesthetics of the external appearance of the electronic device. Further, when the arrangement of the cameras is changed, the position of the microphone hole may be changed. Furthermore, the flexibility of vertical arrangement design that incorporates another microphone hole located on a side surface of the electronic device may be limited.

Aspects of the disclosure are to address at least the above-mentioned problems and/or disadvantages and to provide at least the advantages described below. Accordingly, an aspect of the disclosure is to provide an electronic device including an audio signal path that forms a microphone hole that is capable of receiving audio input from a direction corresponding to capture of a photo by a camera, without affecting the arrangement of the camera.

In accordance with an aspect of the disclosure, an electronic device includes a housing including a first opening formed in a surface thereof, a camera at least partially disposed in the housing, such that a lens of the camera is aligned with the first opening, a camera bracket including a flange structure disposed in the housing and spaced apart from the surface of the housing at a predetermined interval, a protruding structure extending from the flange structure into a space defined between the camera and an inner wall of the first opening to surround at least part of the camera, wherein the flange structure includes a first through-hole, and the protruding structure includes a recess, and wherein the protruding structure and the inner wall of the first opening form a microphone hole in communication with the recess and part of the first opening, an adhesive member disposed between the flange structure and an inner surface of the housing, the adhesive member including a passage, wherein one side of the passage is connected to the recess, and an opposite side of the passage is connected to the first through-hole, and a microphone element disposed in the housing and aligned with the first through-hole.

In accordance with another aspect of the disclosure, an electronic device includes a housing including a first cover, a second cover, and a frame structure surrounding an interior space defined between the first cover and the second cover, the second cover including a first opening, a camera disposed in the interior space of the housing such that a lens of the camera is aligned with the first opening, a camera bracket including a protruding structure surrounding at least part of the camera, and a flange structure formed in the interior space of the housing extending from the protruding structure to face the second cover, wherein at least part of the protruding structure extends to an exterior of the housing through the first opening, wherein the protruding structure includes a side surface forming a recess thereon and a microphone hole with an inner wall of the first opening, a microphone element disposed between the flange structure and the first cover, the microphone element in communication with the microphone hole, and an adhesive member disposed between the flange structure and the second cover, the adhesive member including a passage extending from the microphone hole to the microphone element.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

With regard to description of the drawings, identical or similar reference numerals may be used to refer to identical or similar components.

DETAILED DESCRIPTION

Hereinafter, various embodiments of the disclosure will be described with reference to the accompanying drawings. However, those of ordinary skill in the art will recognize that modification, equivalent, and/or alternative on the various embodiments described herein can be variously made without departing from the scope and spirit of the disclosure.

Figure 1:
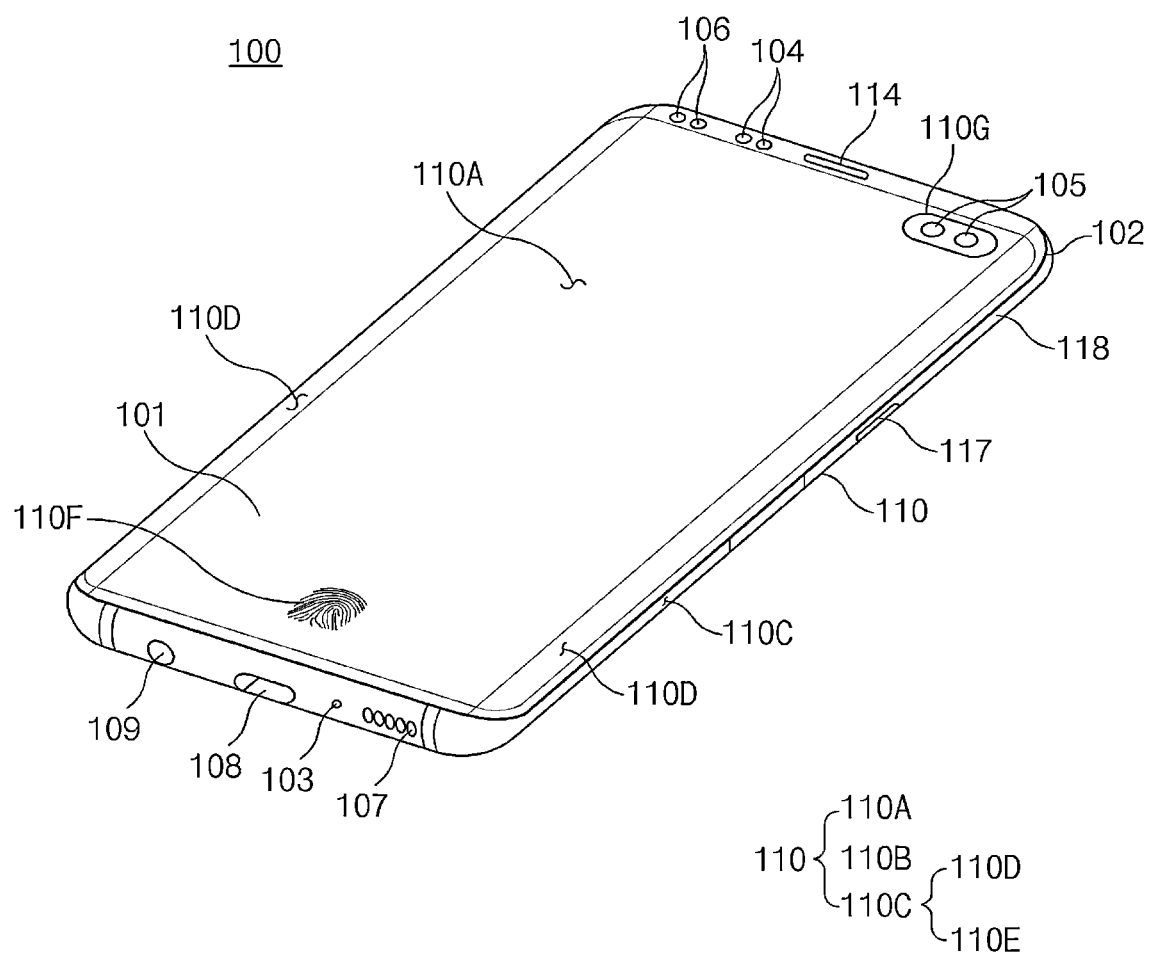
FIG. 1 is a front perspective view of an electronic device according to an embodiment.
Figure 2:
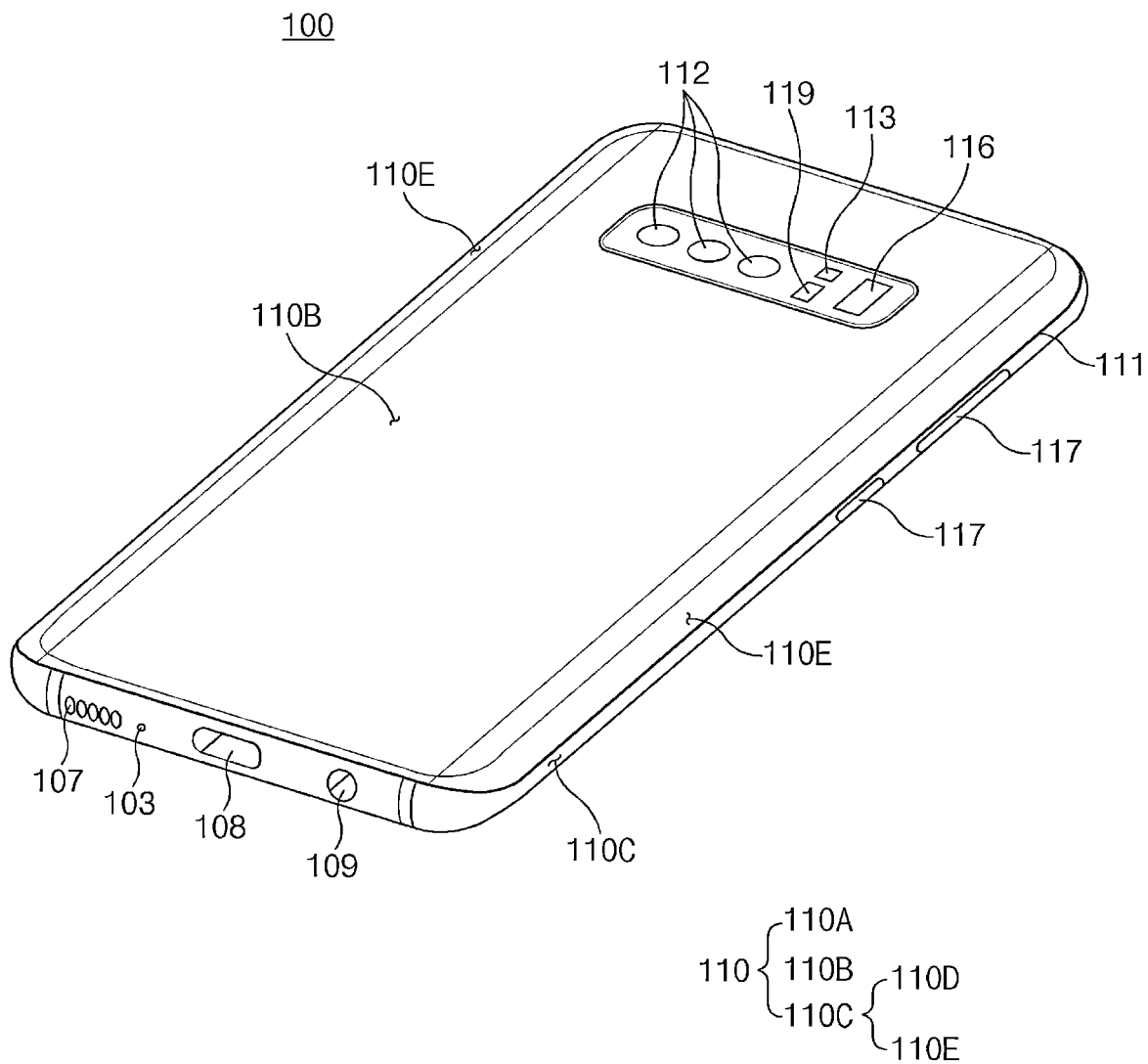
FIG. 2 is a rear perspective view of the electronic device according to an embodiment.

FIG. 1 is a front perspective view of an electronic device according to an embodiment. FIG. 2 is a rear perspective view of the electronic device according to an embodiment.

Referring to FIGS. 1 and 2, the electronic device 100 according to an embodiment may include a housing 110 that includes a first surface (or a front surface) 110A, a second surface (or a rear surface) 110B, and side surfaces 110C that surround a space defined between the first surface 110A and the second surface 110B.

In another embodiment (not illustrated), the housing 110 may refer to a structure that forms some of the first surface 110A, the second surface 110B, and the side surfaces 110C of FIG. 1.

According to an embodiment, the first surface 110A may be formed by a front plate 102, at least part of which is substantially transparent (e.g., a glass plate including various coating layers, or a polymer plate). The second surface 110B may be formed by a back plate 111 that is substantially opaque. The back plate 111 may be formed by, for example, coated or colored glass, ceramic, a polymer, metal (e.g., aluminum, stainless steel (STS), or magnesium), or a combination of at least two thereof. The side surfaces 110C may be formed by a side bezel structure (or a "side member") 118 that is coupled with the front plate 102 and the back plate 111 and that contains metal and/or a polymer.

In some embodiments, the back plate 111 and the side bezel structure 118 may be integrated with each other and may contain the same material (e.g., a metallic material such as aluminum).

In the illustrated embodiment, the front plate 102 may include, at opposite long edges thereof, two first areas 110D that curvedly and seamlessly extend toward the back plate 111 from the first surface 110A.

In the illustrated embodiment (refer to FIG. 2), the back plate 111 may include, at opposite long edges thereof, two second areas 110E that curvedly and seamlessly extend toward the front plate 102 from the second surface 110B.

In some embodiments, the front plate 102 (or the back plate 111) may include only one of the first areas 110D (or the second areas 110E). In another embodiment, the front plate 102 (or the back plate 111) may omit a part of the first areas 110D (or the second areas 110E).

In the embodiments, when viewed from a side of the electronic device 100, the side bezel structure 118 may have a first thickness (or width) at sides (e.g., short sides) not including the first areas 110D or the second areas 110E and may have a second thickness at sides (e.g., long sides) including the first areas 110D or the second areas 110E, the second thickness being smaller than the first thickness.

According to an embodiment, the electronic device 100 may include at least one of a display 101, audio modules 103, 107, and 114, sensor modules 104, 116, and 119, camera modules 105, 112, and 113, key input devices 117, a light emitting element 106, and connector holes 108 and 109. In some embodiments, the electronic device 100 may omit at least one component (e.g., the key input devices 117 or the light emitting element 106) among the aforementioned components, or may additionally include other component(s).

The display 101 may be exposed through, for example, a large portion of the front plate 102. In some embodiments, at least part of the display 101 may be exposed through the front plate 102 that includes the first surface 110A and the first areas 110D of the side surfaces 110C.

In some embodiments, the periphery of the display 101 may be formed to be substantially the same as the shape of the adjacent outside edge of the front plate 102. In another embodiment (not illustrated), the gap between the periphery of the display 101 and the periphery of the front plate 102 may be substantially constant to expand the area by which the display 101 is exposed.

In an embodiment, a surface of the housing 110 (or the front plate 102) may include a screen display area that is formed as the display 101 is visually exposed. For example, the screen display area may include the first surface 110A and the first areas 110D of the side surfaces 110C.

In the illustrated embodiment, the screen display area 110A and 110D may include a sensing area 110F configured to obtain biometric information of a user. Here, when the screen display area 110A and 110D includes the sensing area 110F, this may indicate that at least part of the sensing area 110F overlaps the screen display area 110A and 110D. In other words, the sensing area 110F may refer to an area capable of displaying visual information by the display 101 similarly to the other areas of the screen display area 110A and 110D and additionally obtaining the user's biometric information (e.g., fingerprint).

In the illustrated embodiment, the screen display area 110A and 110D of the display 101 may include an area 110G through which the first camera device 105 (e.g., a punch hole camera) is visually exposed. At least part of the periphery of the area 110G, through which the first camera device 105 is exposed, may be surrounded by the screen display area 110A and 110D. In various embodiments, the first camera device 105 may include a plurality of camera devices.

In another embodiment (not illustrated), recesses or openings may be formed in the screen display area 110A and 110D of the display 101, and the electronic device 100 may include at least one of the audio module 114, the first sensor module 104, and the light emitting element 106 that are aligned with the recesses or the openings.

In another embodiment (not illustrated), the display 101 may include, on a rear surface of the screen display area 110A and 110D, at least one of the audio module 114, the sensor modules 104, 116, and 119, and the light emitting element 106.

In another embodiment (not illustrated), the display 101 may be coupled with, or disposed adjacent to, touch detection circuitry, a pressure sensor for measuring the intensity (pressure) of a touch, and/or a digitizer for detecting a stylus pen of a magnetic type.

In some embodiments, at least a part of the sensor modules 104, 116, and 119 and/or at least a part of the key input devices 117 may be disposed on the side surfaces 110C (e.g., the first areas 110D and/or the second areas 110E).

The audio modules 103, 107, and 114 may include the microphone hole and the speaker holes. A microphone for obtaining a sound from the outside may be disposed in the microphone hole 103, and in some embodiments, a plurality of microphones may be disposed in the microphone hole to sense the direction of a sound. The speaker holes may include the external speaker hole and the receiver hole for a telephone call. In some embodiments, the speaker holes and the microphone hole may be implemented with one hole, and a speaker (e.g., a piezoelectric speaker) may be included without the speaker holes.

The sensor modules 104, 116, and 119 may generate an electrical signal or a data value that corresponds to an operational state inside the electronic device 100 or an environmental state external to the electronic device 100. For example, the sensor modules 104, 116, and 119 may include the first sensor module 104 (e.g., a proximity sensor) that is disposed on the first surface 110A of the housing, the second sensor module 116 (e.g., a TOF camera device) that is disposed on the second surface 110B of the housing 110, the third sensor module 119 (e.g., an HRM sensor) that is disposed on the second surface 110B of the housing 110, and/or the fourth sensor module (e.g., a sensor 190 of FIG. 3) (e.g., a fingerprint sensor) that is coupled to the display 101.

In various embodiments, the second sensor module 116 may include a TOF camera device for measurement of distance.

In various embodiments, at least part of the fourth sensor module (e.g., the sensor 190 of FIG. 3) may be disposed under the screen display area 110A and 110D. For example, the fourth sensor module may be disposed in a recess (e.g., a recess 139 of FIG. 3) that is formed on a rear surface of the display 101. That is, the fourth sensor module (e.g., the sensor 190 of FIG. 3) may not be exposed on the screen display area 110A and 110D and may form the sensing area 110F on at least part of the screen display area 110A and 110D.

In some embodiments (not illustrated), the fingerprint sensor may be disposed on the second surface 110B as well as the first surface 110A of the housing 110 (e.g., the screen display area 110A and 110D).

In various embodiments, the electronic device 100 may further include a non-illustrated sensor module, which may be, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 105, 112, and 113 may include the first camera device 105 (e.g., a punch hole camera device) that is exposed through the first surface 110A of the electronic device 100, and the second camera device 112 and/or the flash 113 exposed through the second surface 110B of the electronic device 100.

In the illustrated embodiment, the first camera device 105 may be exposed through part of the screen display area 110D of the first surface 110A. For example, the first camera device 105 may be exposed on a partial area of the screen display area 110D through an opening (not illustrated) that is formed in part of the display 101.

In the illustrated embodiment, the second camera device 112 may include a plurality of camera devices (e.g., a dual camera or a triple camera). However, the second camera device 112 is not necessarily limited to including the plurality of camera devices, and may include one camera device.

The camera devices 105 and 112 may include one or more lenses, an image sensor, and/or an image signal processor. The flash 113 may include, for example, a light emitting diode or a xenon lamp. In some embodiments, two or more lenses (an IR camera lens, a wide angle lens, and a telephoto lens) and image sensors may be disposed on one surface of the electronic device 100.

The key input devices 117 may be disposed on the side surfaces 110C of the housing 110. In another embodiment, the electronic device 100 may omit all or some of the aforementioned key input devices 117, and the key input devices 117 not included may be implemented in a different form, such as a soft key, on the display 101. In some embodiments, the key input devices may include a sensor module (e.g., the sensor 190 of FIG. 3) that forms the sensing area 110F included in the screen display area 110A and 110D.

The light emitting element 106 may be disposed on, for example, the first surface 110A of the housing 110. For example, the light emitting element 106 may provide state information of the electronic device 100 in the form of light. In another embodiment, the light emitting element 106 may provide, for example, a light source that operates in conjunction with the first camera device 105. The light emitting element 106 may include, for example, an LED, an IR LED, and a xenon lamp.

The connector holes 108 and 109 may include the first connector hole 108 for receiving a connector (e.g., a USB connector) for transmitting and receiving power and/or data with an external electronic device, and/or the second connector hole 109 (e.g., an earphone jack) for receiving a connector for transmitting and receiving audio signals with an external electronic device.

Figure 3:
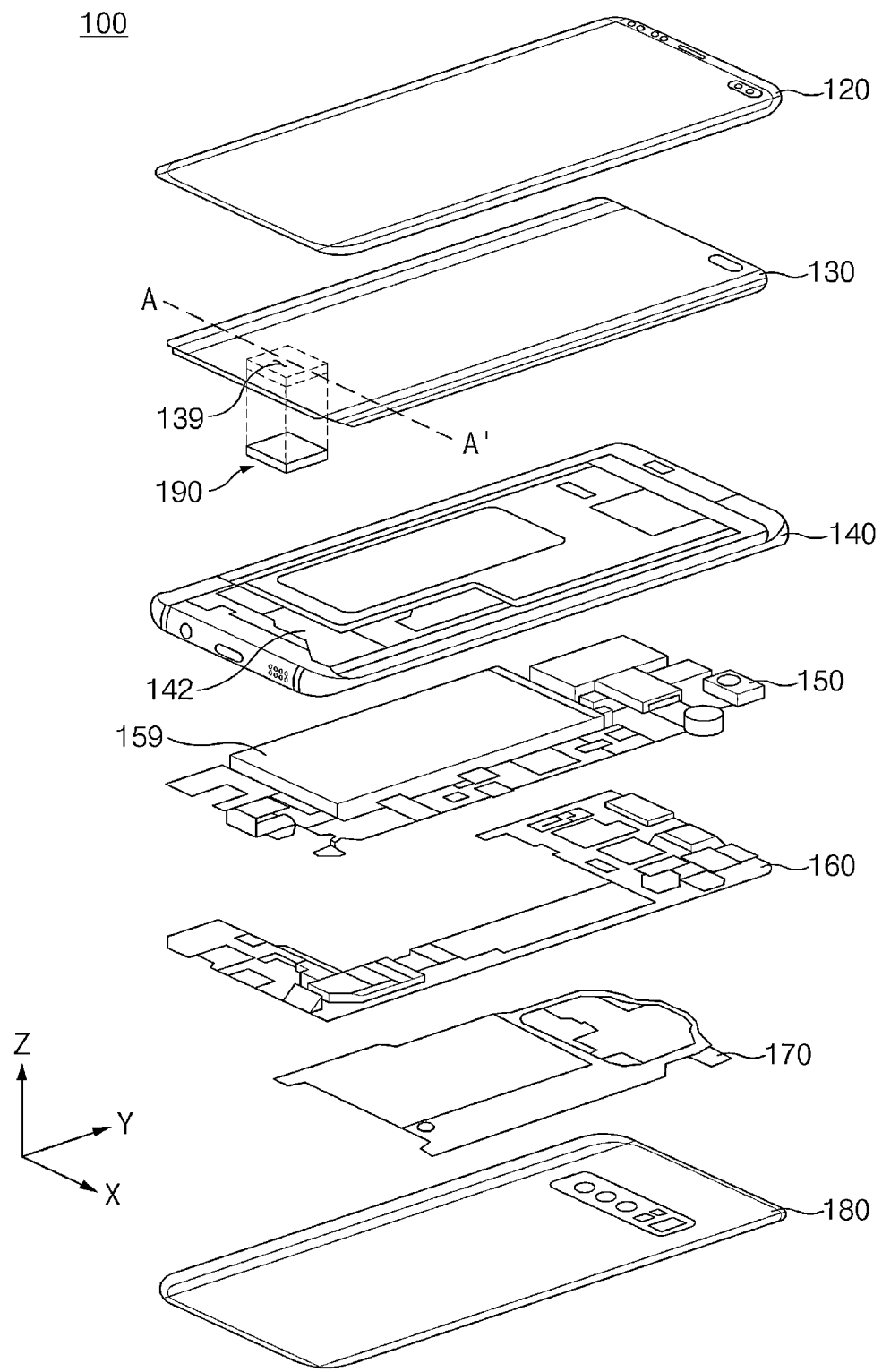
FIG. 3 is an exploded perspective view of an electronic device according to an embodiment.

FIG. 3 is an exploded perspective view of an electronic device according to an embodiment.

Referring to FIG. 3, the electronic device 100 may include a first cover 120 (e.g., the front surface 110A and the first areas 110D of FIG. 1), a display 130 (e.g., the display 101 of FIG. 1), a side member 140 (e.g., a part of the side surfaces 110C of FIG. 1), a first support member 142 (e.g., a plate structure), a printed circuit board 150, a battery 159, a rear case 160, an antenna 170, and a second cover 180 (e.g., the rear surface 110B and the second areas 110E of FIG. 1). In some embodiments, the electronic device 100 may omit one or more components (e.g., the first support member 142 or the rear case 160) among the aforementioned components, or may additionally include other component(s). At least one of the components of the electronic device 100 may be the same as, or similar to, at least one of the components of the electronic device 100 of FIG. 1 or FIG. 2, and repetitive descriptions will hereinafter be omitted.

The first support member 142 may be disposed in the electronic device 100 and may be connected with the side member 140, or may be integrated with the side member 140. The first support member 142 may be formed of, for example, a metallic material and/or a nonmetallic (e.g., polymer) material. The display 130 may be coupled to one surface of the first support member 142, and the printed circuit board 150 may be coupled to an opposite surface of the first support member 142. A processor, a memory, and/or an interface may be mounted on the printed circuit board 150. The processor may include, for example, one or more of a central processing unit, an application processor, a graphic processing unit, an image signal processor, a sensor hub processor, or a communication processor. Hereinafter, the first support member 142 may be referred to as the plate structure 142.

The memory may include, for example, a volatile memory or a nonvolatile memory.

The interface may include, for example, a high definition multimedia interface (HDMI), a universal serial bus (USB) interface, an SD card interface, and/or an audio interface. The interface, for example, may electrically or physically connect the electronic device 100 with an external electronic device and may include a USB connector, an SD card/MMC connector, or an audio connector.

The battery 159, which is a device for supplying power to at least one component of the electronic device 100, may include, for example, a primary cell that is not rechargeable, a secondary cell that is rechargeable, or a fuel cell. For example, at least part of the battery 159 may be disposed on substantially the same plane as the printed circuit board 150. The battery 159 may be integrally disposed in the electronic device 100 and may be disposed so as to be detachable from the electronic device 100.

The antenna 170 may be disposed between the second cover 180 and the battery 159. The antenna 170 may include, for example, a near field communication (NFC) antenna, a wireless charging antenna, and/or a magnetic secure transmission (MST) antenna. For example, the antenna 170 may perform short range communication with an external device, or may wirelessly transmit and receive power required for charging. In another embodiment, an antenna structure may be formed by the side member 140 and/or part of the first support member 142, or a combination thereof.

Figure 4:
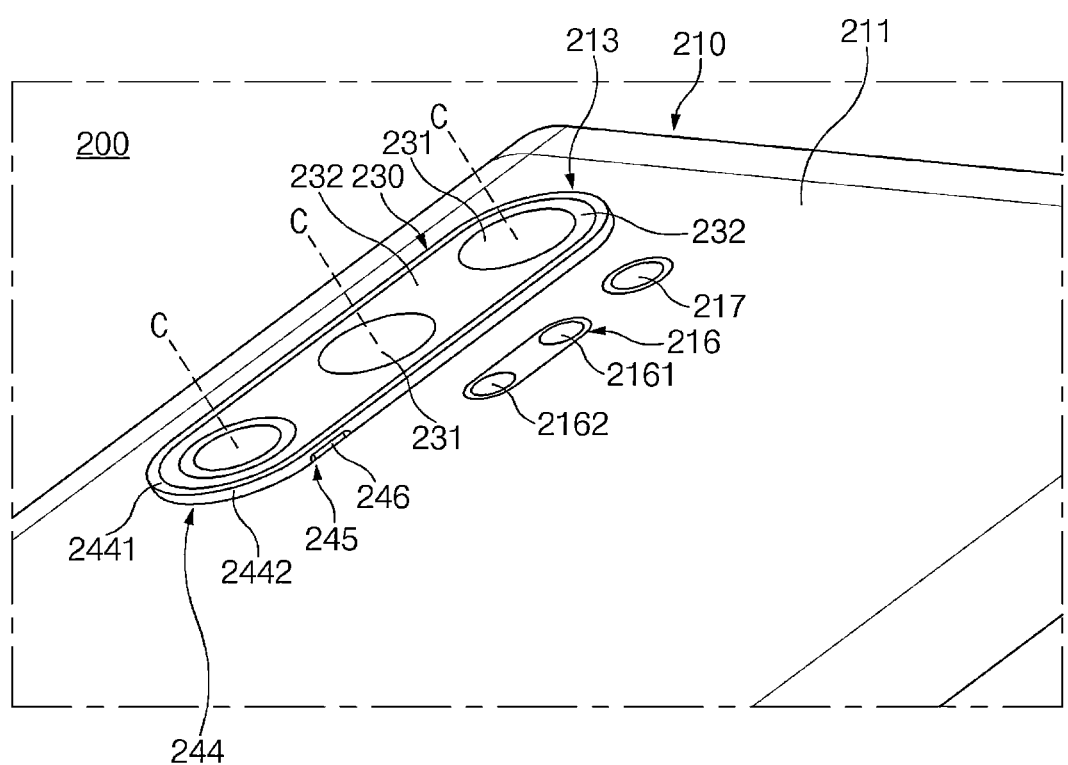
FIG. 4 is a view illustrating a camera area of an electronic device according to various embodiments.

FIG. 4 is a view illustrating a camera area of an electronic device according to various embodiments.

In the illustrated embodiment, the electronic device 200 may include a housing 210, a camera area 213 formed on a surface 211 of the housing 210, a transparent window area 217 formed on the surface 211, an opaque window area 216 formed on the surface 211, and a camera (not illustrated), at least part of which is disposed in the housing 210, the camera being exposed on the surface 211 of the housing 210 through the camera area 213.

In various embodiments, the surface 211 of the housing 210 may include a front surface (e.g., the first surface 110A of FIG. 1) through which a display (e.g., the display 130 of FIG. 3) is visually exposed, a rear surface (e.g., the second surface 110B of FIG. 2) that is opposite the front surface, and side surfaces (e.g., the side surfaces 110C of FIG. 1) that surround a space defined between the front surface and the rear surface. Referring to FIG. 4, the camera area 213 is illustrated as being formed on part of the rear surface of the housing 210. However, in various example embodiments, the camera area 213 may be formed on part of the side surfaces or the front surface.

In the illustrated embodiment, the camera area 213 may include a glass window 230 including a transparent area 231 formed to be transparent such that light may pass through the window 230 to be incident on a camera lens disposed under the transparent area 231, and a protruding structure 244 surrounding the glass window 230, protruding from the surface 211 of the housing 210 to a predetermined height.

In various embodiments, the glass window 230 may be formed along a plane perpendicular to the direction of an optical axis C. The glass window 230 may include the transparent area 231, and an opaque area 232 formed around the transparent area 231 (e.g., circumferentially surrounding the transparent area 231). The opaque area 232 may have a lower light transmittance than the transparent area 231. The transparent area 231 may be aligned with the camera lens. A plurality of transparent areas 231 may be formed to accommodate a plurality of cameras (e.g., at a ratio of one transparent area to one camera). The opaque area 232 may be surrounded by the protruding structure 244.

In the illustrated embodiment, the protruding structure 244 may include a first surface 2441 facing substantially the same direction as the glass window 230, and a side surface 2442 connecting the first surface 2441 and the surface 211 of the housing 210. A recess 245 may be formed on the side surface 2442 of the protruding structure 244. The recess 245 may be formed in an undercut shape. For example, the recess 245 may include an inner wall 246 facing the surface 211 of the housing 210. When viewed from above, the recess 245 may be hidden by the side surface 2442. The recess 245 may form part of a passage that connects the outside of the housing 210 and the interior space of the housing 210. The passage may enable some equalization in atmospheric pressure between an exterior of the housing 210 and the interior space of the housing 210 as to reduce any pressure differences, and/or may facilitate the transmission of audio to a microphone element disposed in the housing 210.

In various embodiments, the transparent window area 217 may be aligned with a flash (e.g., the flash 113 of FIG. 2) that is disposed in the housing 210. Light generated from the flash may be emitted to an exterior of the housing 210 through the transparent window area 217.

In various embodiments, the opaque window area 216 may be aligned with a time of flight (TOF) sensor module (e.g., the second sensor module 116 of FIG. 2) that is disposed in the housing 210. The TOF sensor module may include a sensor module capable of measuring depth. For example, the TOF sensor module may obtain three-dimensional distance information of an object, based on time during which light emitted from a light emitting part is received again.

In various embodiments, the opaque window area 216 may include a first opaque window area 2161 aligned with a light receiving part of the TOF sensor module and a second opaque window area 2162 aligned with the light emitting part of the TOF sensor module.

Figure 5:
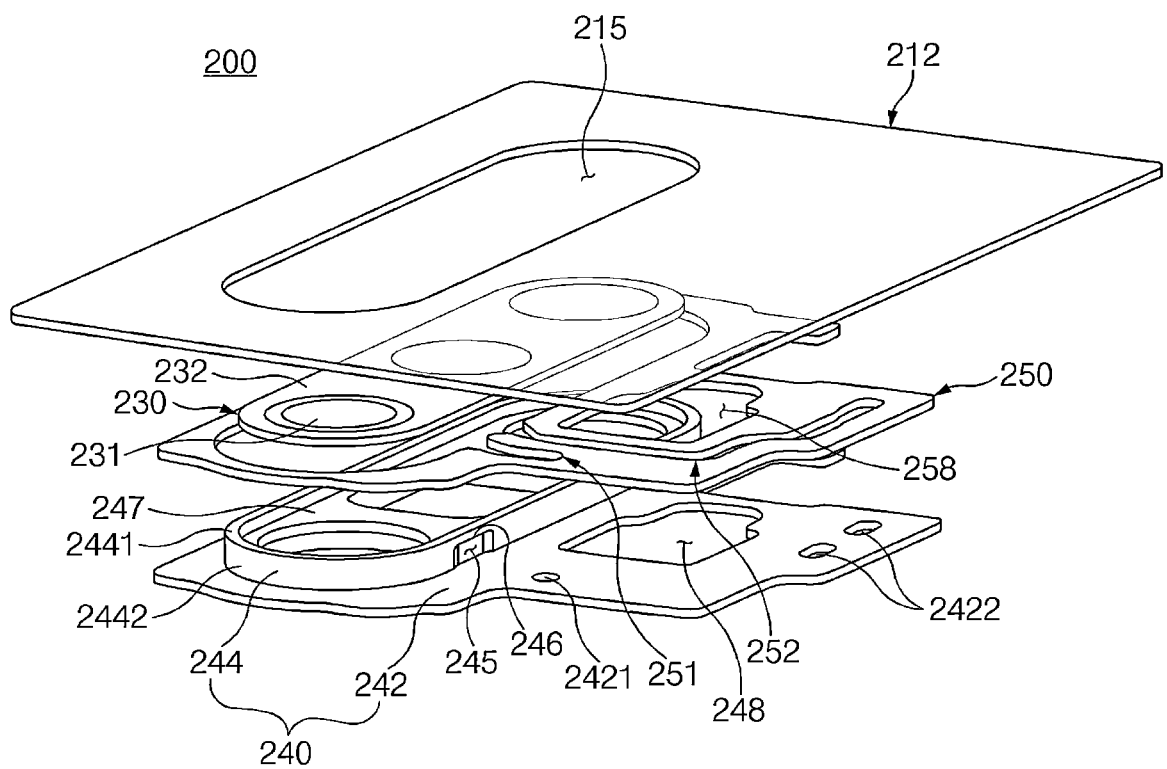
FIG. 5 is an exploded perspective view of the camera area of the electronic device according to various embodiments.

FIG. 5 is an exploded perspective view of the camera area of the electronic device according to various embodiments.

In the illustrated embodiment, the electronic device 200 may include a cover 212 that forms a surface, a camera (not illustrated) that is disposed under the cover 212, a camera bracket 240 on which the camera is installed, an adhesive member 250 disposed between the cover 212 and a flange structure 242, and the glass window 230 that covers the camera.

In the illustrated embodiment, the cover 212 may form one surface of the electronic device 200. For example, the cover 212 may form the front surface or the rear surface of the electronic device 200. Here, the front surface may include an area in which visual information is provided by the display (e.g., the display 130 of FIG. 3). The cover 212 may include a first opening 215 into which at least part of the camera bracket 240 is inserted. The first opening 215 may be formed in a shape substantially corresponding to the protruding structure 244 of the camera bracket 240. The first opening 215 may be aligned with a lens of the camera.

In the illustrated embodiment, the camera bracket 240 may include the flange structure 242 formed to face the cover 212, and the protruding structure 244 extending from the flange structure 242 into the first opening 215. The adhesive member 250 may be disposed on at least part of the flange structure 242. The flange structure 242 may include a plurality of through-holes 2421 and 2422. The flange structure 242 may include the first through-hole 2421 connected with a first passage 251, and the second through-hole 2422 connected with the second passage 252.

In various embodiments, the flange structure 242 may include an opening 248 in which the TOF sensor module (e.g., the second sensor module 116 of FIG. 2) is disposed, and/or aligned with the light emitting part and the light receiving part of the TOF sensor module.

In various embodiments, the camera bracket 240 may be formed of a metallic material. The protruding structure 244 may be formed of the metallic material. The protruding structure 244 may be coated with an insulating material having a predetermined color. The flange area 242 may be formed of a metallic material. The camera bracket 240 may be referred to as a "camera enclosure," in that the camera bracket 240 surrounds (e.g., at least partially encloses) the camera.

In the illustrated embodiment, the protruding structure 244 may extend towards an interior of the first opening 215 from the flange structure 242. When viewed from above, the protruding structure 244 may be formed in a shape substantially corresponding to the shape of the first opening 215. The protruding structure 244 may have the recess 245 formed thereon. The protruding structure 244 may include the side surface 2442 facing an inner wall of the first opening 215. The recess 245 may be formed on the side surface 2442. The recess 245 may include the inner wall 246 facing the flange structure 242. When viewed from above the glass window 230, the recess 245 may not be exposed on the surface (e.g., the rear surface) of the electronic device 200 by the inner wall 246.

In the illustrated embodiment, the recess 245 may be connected with the passages 251 and 252 formed in the adhesive member 250. The exterior of the electronic device 200 may thus be connected with the inside of the electronic device 200 through the recess 245 and the passages 251 and 252 (e.g., for allowing pressure equalization or travel of sound).

In the illustrated embodiment, the protruding structure 244 may include a seating surface 247 on which the glass window 230 is seated. At least one opening into which the camera is inserted may be formed in the seating surface 247. The seating surface 247 may be formed in a lower position than the first surface 2441 of the protruding structure 244. Accordingly, the glass window 230 seated on the seating surface 247 may form substantially the same plane together with the first surface 2441.

In the illustrated embodiment, the glass window 230 may include the transparent area 231, which may allow light to travel through the glass window 230 as to be incident on the lens of the camera. The glass window 230 may further include the opaque area 232 disposed around the transparent area 231. The transparent area 231 may be aligned with the lens of the camera. The opaque area 232 may be seated on the seating surface 247.

In the illustrated embodiment, the adhesive member 250 may be disposed between the cover 212 and the flange structure 242 of the camera bracket 240. The adhesive member 250 may be formed in a shape in which at least a part thereof surrounds the protruding structure 244 of the camera bracket 240. For example, the adhesive member 250 may include an opening into which the protruding structure 244 of the camera bracket 240 is inserted. The adhesive member 250 may include opening areas that extend from the through-holes 2421 and 2422 formed in the flange structure 242 to the recess 245 formed on the protruding structure 244. The opening areas may form the passages 251 and 252 through which air flows from the recess 245 to the through-holes 2421 and 2422. That is, the passage 251 and 252 may be formed by the adhesive member 250, the cover 212, and the flange structure 242. For example, the first passage 251 may extend from the recess 245 to the first through-hole 2421. The second passage 252 may extend from the recess 245 to the second through-hole 2422. In various embodiments, the adhesive member 250 may include a sheet and adhesive tapes formed on opposite surfaces of the sheet.

In various embodiments, the adhesive member 258 may include an opening 258 in which the TOF sensor module (e.g., the second sensor module 116 of FIG. 2) is disposed or that is aligned with the light emitting part and the light receiving part of the TOF sensor module. The opening 258 may be at least partially aligned with the opening 248 of the flange structure 242.

Figure 6:
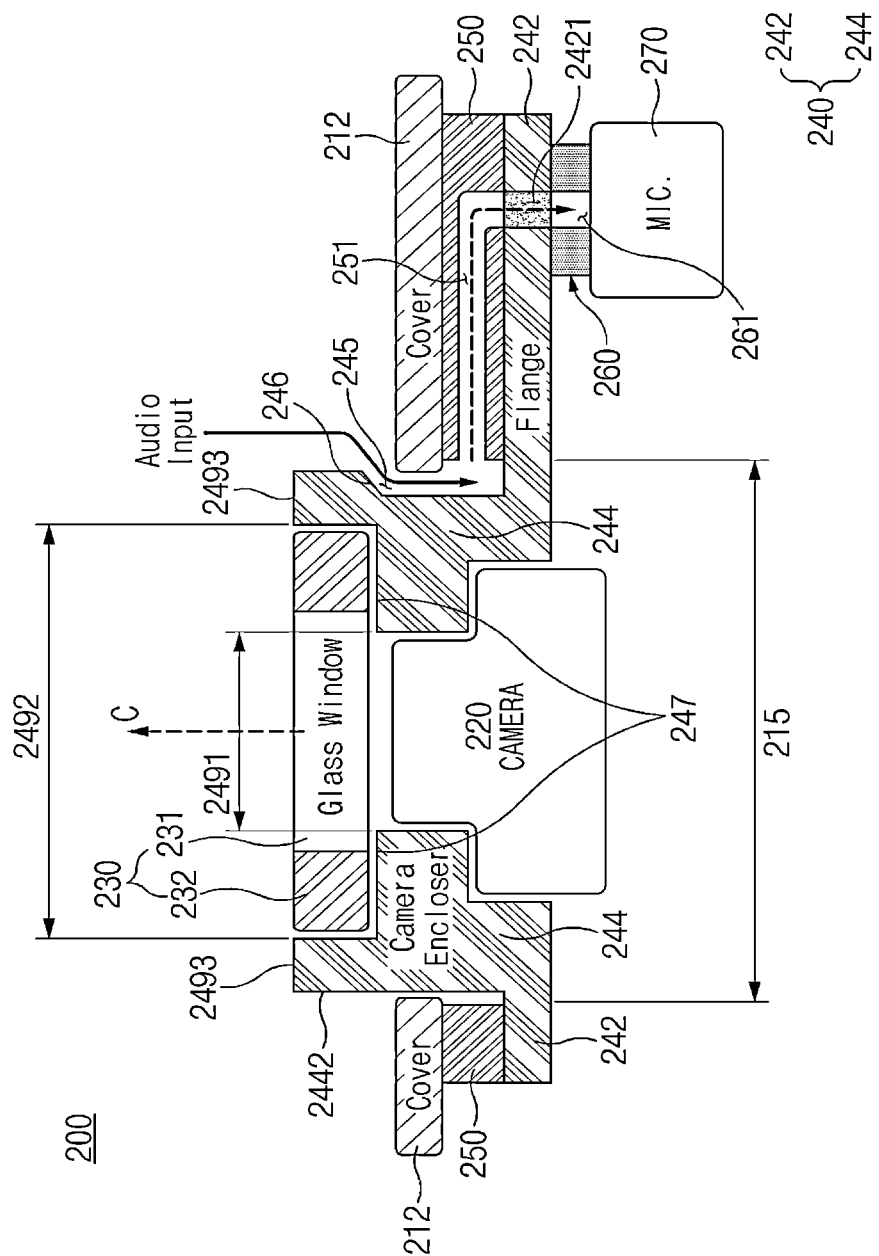
FIG. 6 is a sectional view of the camera area of the electronic device according to various embodiments.

FIG. 6 is a sectional view of the camera area of the electronic device according to various embodiments.

In the illustrated embodiment, the electronic device 200 may include the cover 212, a camera module 220, the camera bracket 240, the adhesive member 250, the glass window 230, and a microphone element 270.

The camera module 220 disclosed herein may include at least one camera. For example, the camera module 220 may include a wide angle camera module, a super-wide angle camera module, and a zoom camera module. In various embodiments, the camera module 220 may include a TOF sensor.

In the illustrated embodiment, the cover 212 may form the front surface or the rear surface of the electronic device 200. For example, the cover 212 may form part of a housing (e.g., the housing 210 of FIG. 4). The cover 212 may be disposed substantially parallel to the flange structure 242 of the camera bracket 240. The cover 212 may be bonded to the flange structure 240 of the camera bracket 240 by the adhesive member 250. The cover 212 may be spaced apart from the recess 245, which is formed on the camera bracket 240, at a predetermined interval as to include an opening. Audio external to the electronic device 200 may be transmitted to the microphone element 270, which is disposed under the cover 212, through the opening, as illustrated in FIG. 6. The cover 212 may include the first opening 215 in which part of the camera bracket 240 is disposed. The first opening 215 may be formed such that the inner wall thereof faces the side surface 2442 of the protruding structure 244 of the camera bracket 240. Part of the protruding structure 244 of the camera bracket 240 may be disposed in the first opening 215.

In the illustrated embodiment, the camera bracket 240 may include the flange structure 242 disposed substantially parallel to the cover 212, and the protruding structure 244 protruding from the flange structure 242 to the outside of the housing (e.g., the housing 210 of FIG. 4) through the inside of the first opening 215. The protruding structure 244 may protrude from a surface of the cover 212 (e.g., the surface 211 of the housing 210 of FIG. 4). The flange structure 242 may be coupled to the cover 212 by the adhesive member 250. The flange structure 242 may face the cover 212. The flange structure 242 may face substantially the same direction as the cover 212. An interior space of the housing (e.g., the housing 210 of FIG. 4) may be formed under the flange structure 242. The microphone element 270 may be disposed under the flange structure 242. The first through-hole 2421 may be formed in the flange structure 242. The first through-hole 2421 may be formed in a position corresponding to the microphone element 270.

In the illustrated embodiment, the protruding structure 244 may extend from the flange structure 242. For example, the protruding structure 244 may vertically extend from the flange structure 242. At least part of the protruding structure 244 may be disposed under the cover 212, and at least part of the protruding structure 244 may protrude above the cover 212. The protruding structure 244 may be formed to surround the camera module 220. For example, the protruding structure 244 may include a second opening 2491 in which part of the camera module 220 is disposed and a third opening 2492 in which the glass window 230 is disposed. The second opening 2491 and the third opening 2492 may be aligned with a lens of the camera module 220. The second opening 2491 may be formed smaller than the third opening 2492. The second opening 2491 and the third opening 2492 may be connected in a stepped manner, and an area around the second opening 2491 may be oriented towards the direction of the optical axis C. The area around the second opening 2491 may include the seating surface 247 on which the glass window 230 is seated. The area around the second opening 2491 may include a step surface formed between the second opening 2491 and the third opening 2492. The glass window 230 may be seated on the area around the second opening 2491. The opaque area 232 of the glass window 230 may be seated on the area around the second opening 2491. An area 2493 around the third opening 2492 may be formed to be substantially the same plane as the glass window 230.

In the illustrated embodiment, the protruding structure 244 may include the side surface 2442 facing the inner wall of the first opening 215 formed in the cover 212. The recess 245 may be concavely formed on the side surface 2442 in a direction toward the center of the first opening 215 (e.g., a direction toward the camera module 220). The recess 245 may include the inner wall 246 facing the flange structure 242. That is, when viewed from above the glass window 230, the recess 245 may be formed in an undercut shape that is hidden by the inner wall 246.

In the illustrated embodiment, the recess 245 may be at least partially connected with the first opening 215. As the cover 212 and the camera bracket 240 are coupled, the recess 245, together with the first opening 215, may form a microphone hole for audio input. At this time, the first passage 251 may be formed by coupling the cover 212 and the flange structure 242 by the adhesive member 250 and may be connected with the microphone hole. Accordingly, external air may be introduced into the first passage 251 through the recess 245 and the first opening 215.

In the illustrated embodiment, the camera module 220 may be disposed under the glass window 230 such that the optical axis C of the lens passes through the glass window 230. The camera module 220 may be disposed such that the lens is aligned with part of the transparent area 231 of the glass window 230. The camera module 220 may be surrounded by the protruding structure 244 of the camera bracket 240. For example, at least part of the camera module 220 may be inserted into the second opening 2491 formed in the protruding structure 244.

In the illustrated embodiment, the adhesive member 250 may be disposed on an area around the protruding structure 244 of the camera bracket 240. The adhesive member 250 may be disposed between the flange structure 242 of the camera bracket 240 and the cover 212. The adhesive member 250 may bond the flange structure 242 to the cover 212. For example, the adhesive member 250 may include a double-sided tape. The adhesive member 250 may include the first passage 251 that is connected with the recess 245 on one side thereof and is connected with the through-holes 2421 and 2422 on an opposite side thereof. The first passage 251 may be formed by the cover 212, the flange structure 242, and the adhesive member 250. The first passage 251 may extend from the recess 245 to the microphone element 270, which is located inward of the cover 212, through the first through-hole 2421. Audio external to the electronic device 200 may be transmitted to the microphone element 270 through the recess 245, the first opening 215, the first passage 251, and the first through-hole 2421.

In the illustrated embodiment, the electronic device 200 may further include a soundproof member 260 for preventing introduction of internal noise into the microphone element 270. The soundproof member 260 may be press-fit between the flange structure 242 and the microphone element 270. The soundproof member 260 may be formed between the flange structure 242 and the microphone element 270 to exert an elastic force. Accordingly, the soundproof member 260 may prevent noise generated in the electronic device 200 (e.g., noise generated in an actuator of the camera) from being introduced into the microphone element 270.

Figure 7:
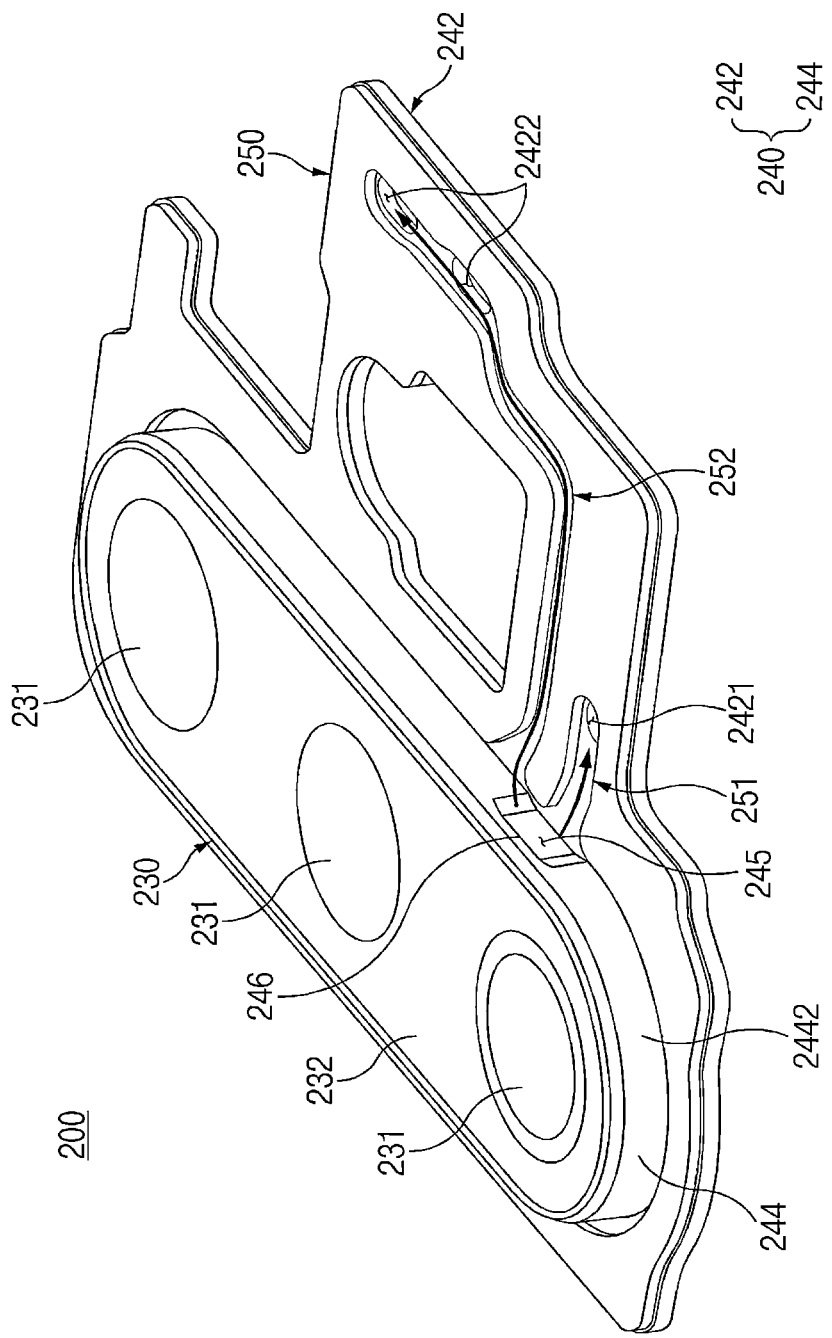
FIG. 7 is a view illustrating a first passage and a second passage of the electronic device according to various embodiments.

FIG. 7 is a view illustrating the first passage and the second passage of the electronic device according to various embodiments. FIG. 7 is a view in which the cover 212 is omitted from the electronic device 200, as illustrated in FIG. 5.

In the illustrated embodiment, the electronic device 200 may include a plurality of cameras (e.g., the camera module 220 of FIG. 6), the camera bracket 240 on which the plurality of cameras are installed, the glass window 230 coupled to the camera bracket 240, the recess 245 formed on the camera bracket 240, and the adhesive member 250 in which the first passage 251 and the second passage 252 extending from the recess 245 are formed.

In the illustrated embodiment, the camera bracket 240 may include the protruding structure 244 surrounding at least a part of the cameras (e.g., the camera module 220 of FIG. 6) and the glass window 230, and the flange structure 242 extending from the protruding structure 244. The protruding structure 244 may include the recess 245 formed on the side surface 2442 thereof. The flange structure 242 may extend from the side surface 2442 of the protruding structure 244 in a perpendicular direction. The flange structure 242 may be formed along a plane facing substantially the same direction as the glass window 230. The flange structure 242 may have the adhesive member 250 formed on a surface thereof. The flange structure 242 may form bottom surfaces of the passages 251 and 252.

In the illustrated embodiment, the glass window 230 may include a plurality of transparent areas 231 and the opaque area 232 surrounding the transparent areas 231. There may be as many transparent areas 231 as there are cameras for the electronic device. The transparent areas 231 may be aligned with camera lenses. The periphery of the opaque area 232 may be surrounded by the protruding structure 244.

In the illustrated embodiment, the bottom surfaces of the passages 251 and 252 may be formed by the flange structure 242 of the camera bracket 240, and sidewalls of the passages 251 and 252 may be formed by the adhesive member 250. For example, the passages 251 and 252 may include opening areas that are formed in the adhesive member 250 and that have predetermined shapes. The opening areas may be formed in the predetermined shapes extending from the recess 245 to the through-holes 2412 and 2422.

In the illustrated embodiment, the passages 251 and 252 may include the first passage 251 extending to the first through-hole 2421 and the second passage 252 extending to the second through-hole 2422. The first passage 251 may be connected to a microphone element (e.g., the microphone element 270 of FIG. 6) through the first through-hole 2421. The first passage 251 may be an audio signal path along which audio is input to the microphone element (e.g., the microphone element 270 of FIG. 6). The second passage 252 may be an air vent passage that connects the outside of the electronic device 200 and the inside of the electronic device 200 to equalize air pressure in the electronic device 200 and external atmospheric pressure. In various embodiments, a plurality of second through-holes 2422 may be formed.

In various embodiments, the first passage 251 and the second passage 252 may extend from the recess 245 to the first through-hole 2421 and the second through-hole 2422, respectively.

In various embodiments, mesh members for waterproofing may be disposed or formed in the through-holes 2421 and 2422. The mesh members may contain a GORE-TEX material.

In the illustrated embodiment, the recess 245 may include the inner wall 246 facing the flange structure 242. The recess 245 may be formed in a shape that is closed in the direction in which the protruding structure 244 protrudes (e.g., the upper direction with respect to the drawing). The recess 245 may be formed in a shape that is open in a direction (e.g., the direction toward the flange structure 242 or the lower direction with respect to the drawing) that is opposite to the direction in which the protruding structure 244 protrudes. When viewed from above the glass window 230, the recess 245 may be visually hidden by the inner wall 246.

Figure 8:
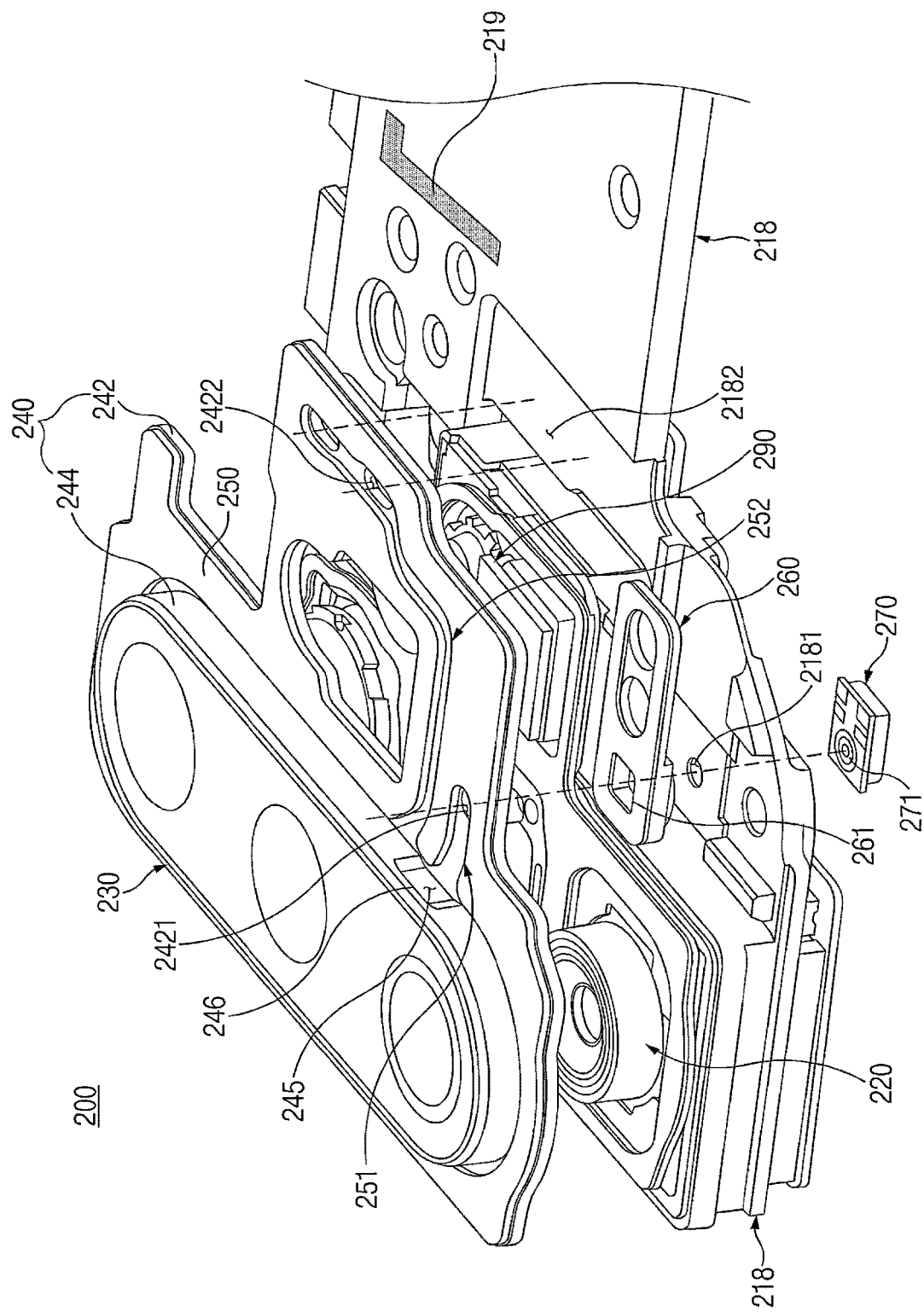
FIG. 8 is an exploded perspective view of a camera area of an electronic device according to various embodiments.

FIG. 8 is an exploded perspective view of a camera area of an electronic device according to various embodiments. FIG. 8 is a view in which the housing 210 is omitted from the electronic device 200, as illustrated in FIG. 4. Hereinafter, in describing FIG. 8, repetitive descriptions identical to ones given with reference to FIG. 6 will be omitted as duplicative, for the sake of brevity.

In the illustrated embodiment, the electronic device 200 may include a camera module 220, a camera bracket 240, an adhesive member 250, a glass window 230, a microphone element 270, a rear case 218 (e.g., the rear case 160 of FIG. 3), and a soundproof member 260. In various embodiments, the adhesive member 250, the glass window 230, the microphone element 270, the rear case 218, and the soundproof member 260 may be disposed in the electronic device 200. In various embodiments, at least part of the camera module 220 and at least part of the camera bracket 240 may form a surface (e.g., the rear surface) of the electronic device 200, or may be exposed outside a housing (e.g., the housing 210 of FIG. 4) that is included in the electronic device 200.

Figure 9:
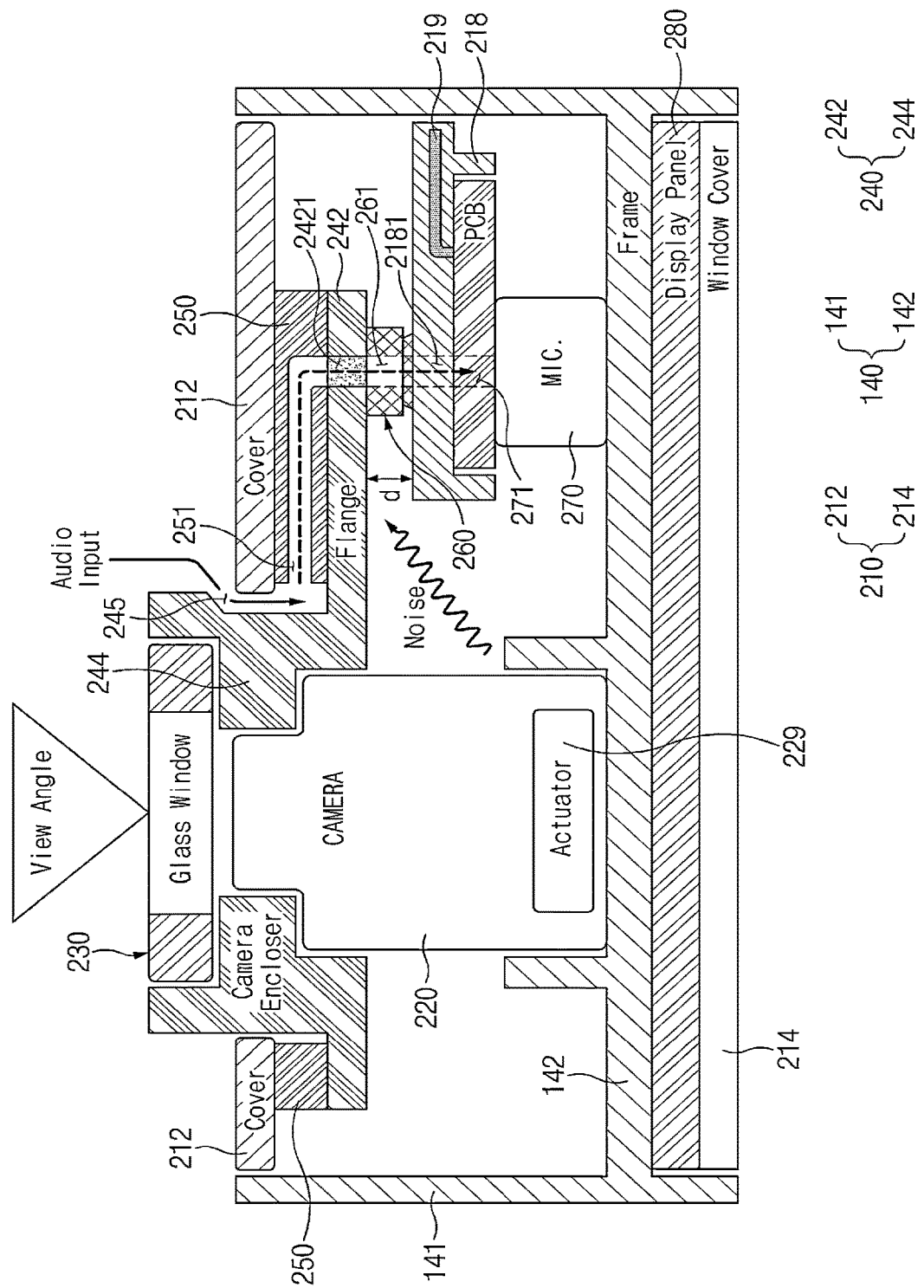
FIG. 9 is a sectional view of the camera area of the electronic device according to various embodiments.

In various embodiments, the camera module 220 may include one or more actuators 229 (e.g., an actuator 229 of FIG. 9). For example, the actuators 229 may include an actuator for preventing a camera-shake, an actuator for auto focusing, and/or a shutter actuator. Noise may be generated when the actuators 229 operate. The soundproof member 260 may be disposed between the microphone element 270 and a flange structure 242 to block any generated noise from operation of the actuators.

In the illustrated embodiment, the camera bracket 240 and the soundproof member 260 may be disposed on one surface (e.g., an upper surface with respect to the drawing) of the rear case 218, and a printed circuit board (e.g., the printed circuit board 150 of FIG. 3) and the microphone element 270 may be disposed on an opposite surface (e.g., a lower surface with respect to the drawing) of the rear case 218. The rear case 218 may be formed of an insulating material, and a conductive pattern 219 containing a conductive material may be formed on a partial area of the rear case 218. The conductive pattern 219 may include an antenna.

In the illustrated embodiment, a second recess 2182 may be formed on the one surface of the rear case 218. The second recess 2182 may be formed to be aligned with a second through-hole 2422 formed in the flange structure 242 of the camera bracket 240. The second recess 2182, together with a first recess 245, a second passage 252, and the second through-hole 2422, may form an air vent passage that allows air outside the electronic device 200 and air inside the electronic device 200 to be in fluid communication with each other.

In the illustrated embodiment, a third through-hole 2181 may be formed in the rear case 218. The third through-hole 2181 may be connected with an opening 261 of the soundproof member 260 on one side thereof and may be connected with an opening 271 of the microphone element 270 on an opposite side thereof. The third through-hole 2181, together with the first recess 245 and a first passage 251, may form a path through which audio from an external environment of the electronic device 200 may pass through the body of the device to be transmitted to the microphone element 270.

In the illustrated embodiment, the soundproof member 260 may be disposed between the one surface of the rear case 218 and the flange structure 242. The soundproof member 260 may include the opening 261 connected with a first through-hole 2421 formed in the flange structure 242. The opening 261 may be connected with the first through-hole 2421 of the flange structure 242 and the opening 271 of the microphone element 270.

In various embodiments, the soundproof member 260 may be press-fit between the flange structure 242 and the rear case 218. The soundproof member 260 may be formed between the flange structure 242 and the rear case 218 to exert an elastic force. For example, the soundproof member 260 may contain a rubber material. Accordingly, the soundproof member 260 may prevent noise generated in the electronic device 200 (e.g., noise generated in the actuators 229 of the camera module 220) from being detected and recorded by the microphone element 270.

In various embodiments, the TOF sensor module 290 (e.g., the second sensor module 116 of FIG. 2) is partially disposed in an opening provided in the flange structure 242.

In various embodiments, the TOF sensor module 290 may be configured to measure distance of an object. For example, the TOF sensor module may obtain three-dimensional distance information of an object, based on time during which light emitted from a light emitting part is received again.

FIG. 9 is a sectional view of the camera area of the electronic device according to various embodiments.

In the illustrated embodiment, the electronic device 200 may include the housing 210, a display 280, the rear case 218, the camera module 220, the camera bracket 240, the adhesive member 250, the soundproof member 260, and the microphone element 270.

In the illustrated embodiment, the housing 210 may include a front cover 214 (e.g., the first cover 120 of FIG. 3) that forms a front surface of the electronic device 200, a rear cover 212 (e.g., the second cover 180 of FIG. 3) that forms a rear surface of the electronic device 200, and a side member 140 that forms side surfaces of the electronic device 200. Here, the front surface of the electronic device 200 may indicate a direction in which visual information is exposed through the display 280, and the side surfaces may refer to surfaces that surround a space defined between the front surface and the rear surface.

In various embodiments, the side member 140 may include a frame structure 141 that surrounds an interior space defined between the front cover 214 and the rear cover 212 and forms the side surfaces of the electronic device 200, and a plate structure 142 (e.g., the first support member 142 of FIG. 3) that extends from the frame structure 141 into the interior space. The rear case 218, the microphone element 270, the adhesive member 250, and the printed circuit board (e.g., the printed circuit board 150 of FIG. 3) may be contained in the interior space.

In various embodiments, the display 280 may be disposed between the plate structure 142 of the side member 140 and the front cover 214, and may provide visual information through the front cover 214.

In various embodiments, the rear case 218 may be disposed between the rear cover 212 and the plate structure 142 of the side member 140. The soundproof member 260 may be disposed on the one surface of the rear case 218, and the microphone element 270 may be disposed on the opposite surface of the rear case 218. The third through-hole 2181 may be formed in the rear case 218, and may be aligned with the second through-hole 2422 of the flange structure 242 and the opening 271 of the microphone element 270. The rear case 218 may include the conductive pattern 219. The conductive pattern 219 may include an antenna.

In various embodiments, the camera bracket 240 may include the flange structure 242 facing the rear cover 212, and a protruding structure 244 extending from the flange structure 242 to an exterior of the rear cover 212. The flange structure 242 may be formed to be substantially parallel to the rear cover 212. The protruding structure 244 may surround at least part of the camera module 220. The protruding structure 244 may vertically extend from the flange structure 242. For example, part of the protruding structure 244 may protrude from the rear surface of the electronic device 200 through an opening formed in the rear cover 212. As described above, part of the protruding structure 244 may surround the camera module 220, and the remaining portion thereof may surround the glass window 230.

In the illustrated embodiment, the adhesive member 250 may be disposed between the flange structure 242 and the rear cover 212. The adhesive member 250 may include the first passage 251 extending from the recess 245 formed on the protruding structure 244 to the first through-hole 2421 formed in the flange structure 242.

In the illustrated embodiment, the soundproof member 260 may be disposed between the rear case 218 and the flange structure 242. The soundproof member 260 may include the opening 261 connected with the first passage 251. The soundproof member 260 may be disposed such that the opening 261 is aligned with the first through-hole 2421 formed in the flange structure 242 and the third through-hole 2181 formed in the rear case 218. The soundproof member 260 may prevent noise generated in the housing 210 (e.g., noise generated in the actuators 229 of the camera module 220) from being detected by the microphone element 270. To achieve this, the soundproof member 260 may be formed of an elastic material and may be press-fit between the flange structure 242 and the rear case 218. That is, in an equilibrium state, the soundproof member 260 may have a thickness greater than the distance "d" between the flange structure 242 and the rear case 218. The soundproof member 260 may be secured in a compressed state between the flange structure 242 and the rear case 218. Accordingly, noise in the electronic device 200 may be prevented from being introduced into the microphone element 270 by the barrier of the soundproof member 260.

In various embodiments, audio external to the electronic device 200 may be transmitted to the microphone element 270 through the recess 245 of the protruding structure 244, the first passage 251 between the flange structure 242 and the rear cover 212, the first through-hole 2421 formed in the flange structure 242, the opening 261 of the soundproof member 260, and the third through-hole 2181 of the rear case 218.

Figure 10A:
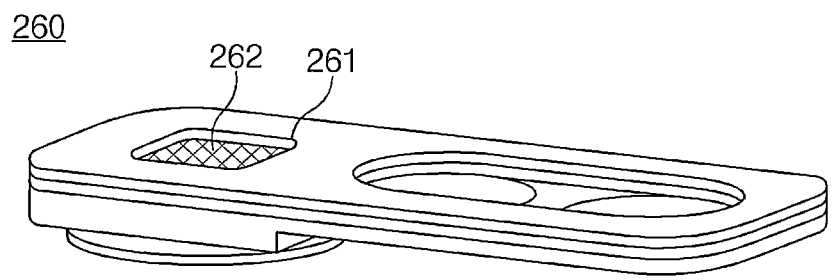
FIGS. 10A and 10B are views illustrating a soundproof member of the electronic device according to various embodiments.
Figure 10B:
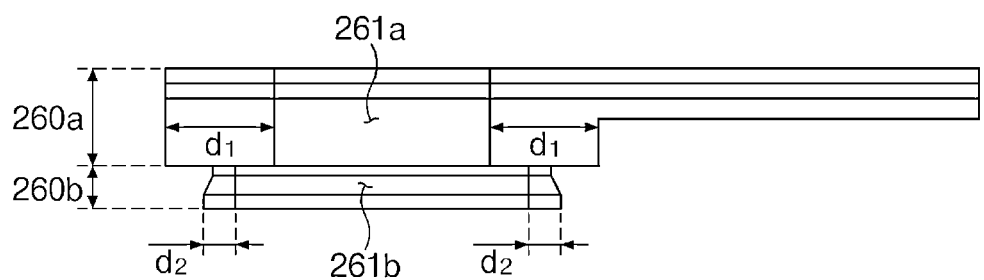

FIGS. 10A and 10B are views illustrating the soundproof member of the electronic device according to various embodiments.

In the illustrated embodiment, the soundproof member 260 may include a first portion 260a coupled to a flange structure (e.g., the flange structure 242 of FIG. 9), a second portion 260b coupled to a rear case (e.g., the rear case 218 of FIG. 9), and the opening 261 formed through the first portion 260a and the second portion 260b. As described above, the soundproof member 260 may be press-fit between the flange structure 242 and the rear case 218. Accordingly, pressure may be applied to the soundproof member 260. Pressure may compress the soundproof member 260.

In the illustrated embodiment, the second portion 260b may be more compressed than the first portion 260a when pressure is applied. For example, an opening 261b formed in the second portion 260b may have a larger diameter than an opening 261a formed in the first portion 260a. The thickness d2 of a sidewall of the second portion 260b may be smaller than the thickness d1 of a sidewall of the first portion 260a.

In the illustrated embodiment, the soundproof member 260 may further include a mesh member 262 formed in the opening 261. The mesh member 262 may prevent moisture entering through a recess (e.g., the recess 245 of FIG. 8) from infiltrating into the microphone element (e.g., the microphone element 270 of FIG. 9).

Figure 11A:
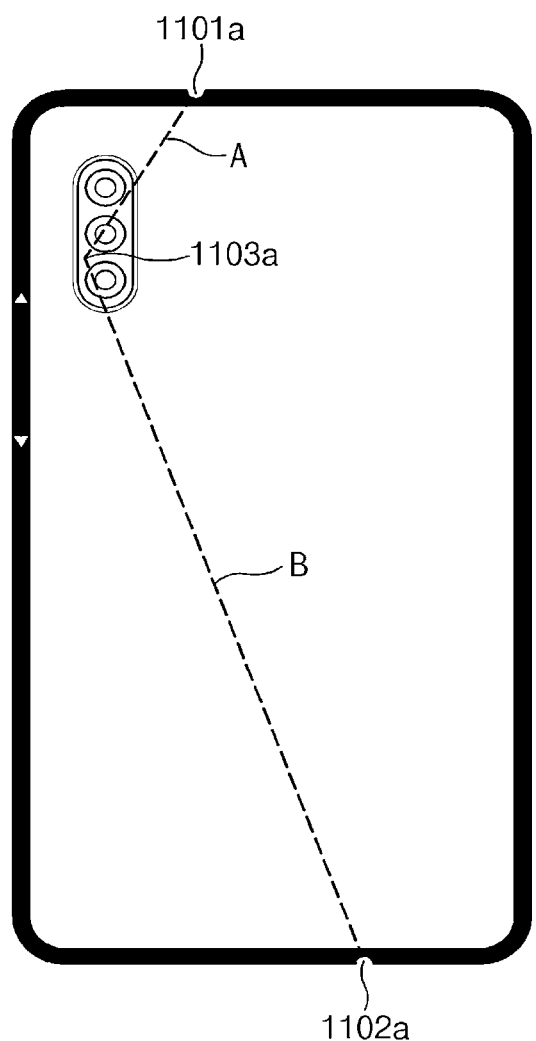
FIGS. 11A and 11B are views illustrating arrangements of microphone holes of electronic devices according to various embodiments.
Figure 11B:
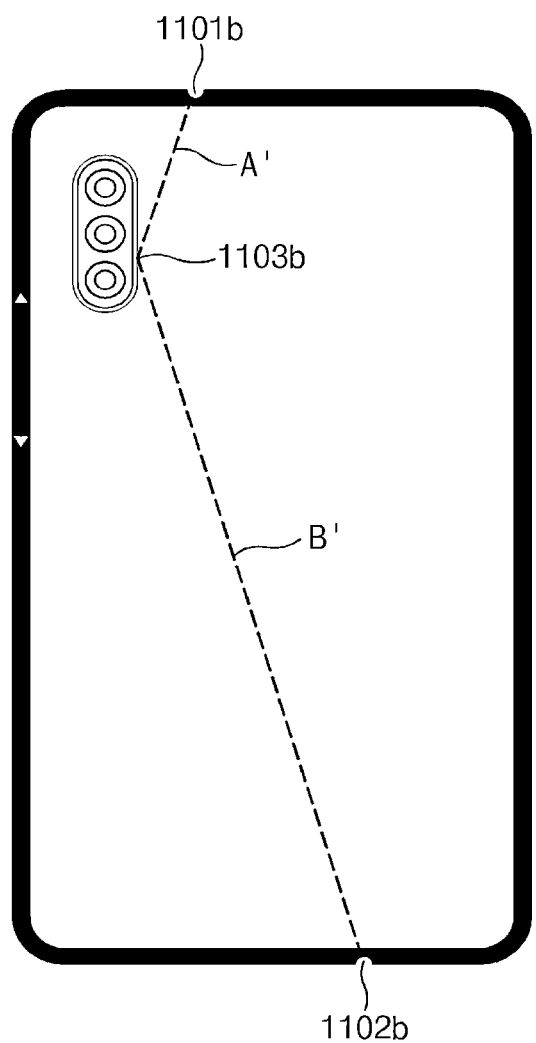

FIGS. 11A and 11B are views illustrating arrangements of microphone holes of electronic devices according to various embodiments. FIG. 11A is a view illustrating an arrangement of microphone holes of an electronic device in the related art. FIG. 11B is a view illustrating an arrangement of microphone holes of an electronic device according to embodiments of the disclosure.

Referring to FIGS. 11A and 11B, the electronic devices may include a plurality of microphone holes 1101a, 1101b, 1102a, 1102b, 1103a, and 1103b. For example, the electronic devices may include the first microphone holes 1101a and 1101b formed in first side surfaces of the electronic devices, the second microphone holes 1102a and 1102b formed in second side surfaces facing the first side surfaces, and the third microphone holes 1103a and 1103b formed in camera areas. The plurality of microphone holes 1101a, 1101b, 1102a, 1102b, 1103a, and 1103b may be connected to a plurality of microphone elements (e.g., the microphone element 270 of FIG. 9) that are disposed in the electronic devices.

In various embodiments, the first microphone holes 1101a and 1101b and the second microphone holes 1102a and 1102b may be configured such that audio is input thereto from opposite directions. For example, in landscape modes of the electronic devices, audio may be input to the first microphone holes 1101a and 1101b from the right (or the left), and audio may be input to the second microphone holes 1102a and 1102b from the left (or the right). That is, the first microphone holes 1101a and 1101b and the second microphone holes 1102a and 1102b may support stereo input.

In various embodiments, the third microphone holes 1103a and 1103b may be configured such that audio is input thereto from the rear. This may allow input of audio generated from any direction in which front or rear-facing cameras of the device capture media. Accordingly, the electronic devices may support 3-channel stereo input. The microphone holes may preferably be arranged on one straight line for improvement of audio recognition performance. That is, the third microphone holes 1103a and 1103b may be placed on virtual lines that connect the first microphone holes 1101a and 1101b and the second microphone holes 1102 and 1102b.

The electronic device in the related art, which is illustrated in FIG. 11A, may include the third microphone hole 1103a formed in a glass window in the camera area. In this case, a first virtual line "A" extending from the third microphone hole 1103a to the first microphone hole 1101a and a second virtual line "B" extending from the third microphone hole 1103a to the second microphone hole 1102a may be defined. The first virtual line "A" and the second virtual line "B" may form a first angle.

In contrast, the electronic device illustrated in FIG. 11B, as described above, may receive audio input through a recess formed on a protruding structure of a camera bracket. That is, the third microphone hole 1103b may include the recess. In this case, a first virtual line A' extending from the third microphone hole 1103b to the first microphone hole 1101b and a second virtual line B' extending from the third microphone hole 1103b to the second microphone hole 1102b may be defined. The first virtual line A' and the second virtual line B' may form a second angle that is closer to 180 degrees than the first angle.

Accordingly, the electronic device according to the embodiments of the disclosure may be more advantageous for arranging the microphone holes because the electronic device includes the third microphone hole formed in the recess of the protruding structure rather than the glass window.

An electronic device 200 according to embodiments of the disclosure may include a housing 210 having a first opening formed in a surface 211 thereof, a camera 220, at least part of which is disposed in the housing 210 such that a lens is aligned with the first opening 215, a camera bracket 240 including a flange structure 242 disposed in the housing 210 so as to be spaced apart from the surface 211 of the housing 210 at a predetermined interval and a protruding structure 244 extending from the flange structure 242 into a space defined between the camera 220 and an inner wall of the first opening 215 to surround at least part of the camera 220, in which the flange structure 242 has a through-hole 2421 formed therein and the protruding structure 244 has a recess 245 formed thereon, a microphone hole that is formed by the protruding structure 244 and the inner wall of the first opening 215 and that includes the recess 245 and part of the first opening 215, an adhesive member 250 that is disposed between the flange structure 242 and an inner surface of the housing 210 and that has a passage 251 formed therein, in which one side of the passage 251 is connected to the recess 245 and an opposite side of the passage 251 is connected to the through-hole 2421, and a microphone element 270 disposed in the housing 210 so as to be aligned with the through-hole 2421.

In various embodiments, the recess 245 may be formed so as not to be visually exposed when viewed from above the surface 211 of the housing 210.

In various embodiments, the protruding structure 244 may include a first surface 2441 that faces substantially the same direction as the surface 211 of the housing 210 and a side surface 2442 that is formed between the first surface 2441 and the surface 211 of the housing 210 and that extends from the first surface 2441 at a predetermined angle, and the recess 245 may be formed on the side surface 2442.

In various embodiments, the first surface 2441 may form the same plane as the surface 211 of the housing 210, or may be formed in a higher position in a direction of an optical axis of the lens than the surface 211 of the housing 210.

In various embodiments, the recess 245 may be formed in an undercut shape.

In various embodiments, the adhesive member 250 may include a double-sided tape.

In various embodiments, the electronic device may further include a glass window 230 that covers the camera 220. The protruding structure 244 may include a second opening into which at least part of the camera 220 is inserted, a third opening 2492 formed to be larger than the second opening 2491, and a seating surface 247 that forms a step between the second opening 2491 and the third opening 2492, the glass window 230 being disposed in the third opening 2492. The glass window 230 may be seated on the seating surface 247.

In various embodiments, the glass window 230 may include a transparent area 231 through which an optical axis of the lens passes and an opaque area 232 formed around the transparent area 231, and the opaque area 232 may be seated on the seating surface.

In various embodiments, the electronic device may further include a soundproof member 260 disposed between the microphone element 270 and the flange structure 242, and the soundproof member 260 may be formed of an elastic material so as to be press-fit between the microphone element 270 and the flange structure 242.

In various embodiments, the electronic device may further include a rear case 218 that is disposed in the housing 210 and that extends between the flange structure 242 and the microphone element 270. A second through-hole 2181 aligned with the through-hole 2421 may be formed in the rear case 218, and the microphone element 270 may be disposed to be aligned with the second through-hole 2181.

In various embodiments, the soundproof member 260 may be disposed between the flange structure 242 and the rear case 218 and may include a fourth opening 261 that connects the through-hole 2421 and the second through-hole 2181, and a waterproof mesh member that prevents infiltration of moisture into the microphone element 270 may be formed in the fourth opening.

In various embodiments, the soundproof member 260 may be formed of an elastic material, and the soundproof member 260 may be disposed in a compressed state between the flange structure 242 and the rear case 218.

In various embodiments, a third through-hole connected with an interior space of the housing 210 may be formed in the flange structure 242, and the adhesive member 250 may have an air vent passage 252 formed therein, the air vent passage 252 extending from the microphone hole to the third through-hole to equalize pressure inside the housing 210 and pressure outside the housing 210.

An electronic device 200 according to embodiments of the disclosure may include a housing 210 including a first cover 120, a second cover 180, and a frame structure 141 that surrounds an interior space defined between the first cover 120 and the second cover 180, the second cover 180 having a first opening 215 formed therein, a camera 220 disposed in the interior space of the housing 210 such that a lens is aligned with the first opening 215, a camera bracket 240 including a protruding structure 244 that surrounds at least part of the camera 220 and a flange structure 242 that is formed in the interior space of the housing 210 and that extends from the protruding structure 244 to face the second cover 180, in which at least part of the protruding structure 244 extends to the outside of the housing 210 through the first opening 215, a microphone element 270 disposed between the flange structure 242 and the first cover, a microphone hole that includes a recess 245 formed on a side surface 2442 of the protruding structure 244 and part of the first opening 215 and that is formed by the side surface 2442 of the protruding structure 244 and an inner wall of the first opening 215, and an adhesive member 250 that is disposed between the flange structure 242 and the second cover 180 and that includes a passage 251 extending from the microphone hole to the microphone element 270.

In various embodiments, the recess 245 may be formed in an undercut shape.

In various embodiments, the recess 245 may include an inner wall 246 that faces the second cover 180, and the recess 245 may be visually hidden by the inner wall 246 when viewed from above the second cover.

In various embodiments, the flange structure 242 may include a first through-hole connected with the passage 251, and the microphone element 270 may be disposed such that an input hole is aligned with the first through-hole.

In various embodiments, the electronic device may further include a plate structure 142 extending from the frame structure 141 into the interior space defined between the first cover 120 and the second cover 180 and a printed circuit board disposed on the plate structure 142. The camera 220 may be disposed on the plate structure 142, and the microphone element 270 may be disposed on the printed circuit board.

In various embodiments, the protruding structure 244 may include a second opening 2491 into which at least part of the camera 220 is inserted, a third opening 2492 formed to be larger than the second opening 2491, and a seating surface 247 that forms a step between the second opening 2491 and the third opening 2492, and the electronic device may further include a glass window 230 seated on the seating surface to cover the camera 220.

In various embodiments, the electronic device may further include a soundproof member 260 disposed between the microphone element 270 and the flange structure 242, and the soundproof member 260 may be formed of an elastic material so as to be press-fit between the microphone element 270 and the flange structure 242.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device 100). For example, a processor (e.g., the processor) of the machine (e.g., the electronic device 100) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to the embodiments of the disclosure, when viewed from above the rear surface of the electronic device, the microphone hole may not be exposed to the outside, and thus aesthetics of the electronic device may be improved. Furthermore, the microphone hole may be more advantageous for a vertical alignment with another microphone hole located on the side surface of the housing.

In addition, the disclosure may provide various effects that are directly or indirectly recognized.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   a housing including a cover having a first opening formed in a portion thereof;
   a camera disposed within the housing such that a lens of the camera is visible via the first opening;
   a camera bracket including:
     a first fixing member to which a glass window covering the camera is fixed, and a second fixing member to which the first fixing member is fixed,
     wherein the first fixing member includes a recess formed on an outer surface, the second fixing member includes a first through-hole formed in a portion thereof, and the first through hole and the first recess are connected to allow airflow; and
   a microphone disposed within the housing and aligned with the first through-hole, wherein sound originating from an exterior of the electronic device reaches the microphone via travel through the recess and the first through-hole.

2. The electronic device of claim 1, wherein the recess is covered by a portion of the first fixing member when viewed from above the glass window.

3. The electronic device of claim 1, wherein the recess is obscured by a non-recessed portion of the first fixing member when viewed from above the cover.

4. The electronic device of claim 1, wherein the first surface is disposed higher than the cover of the housing respective to a direction of an optical axis of the lens.

5. The electronic device of claim 1, further comprising a soundproof member disposed between the microphone and the second fixing member.

6. The electronic device of claim 5, wherein the soundproof member is formed of an elastic material and press-fit between the microphone and the second fixing member.

7. The electronic device of claim 5, wherein the soundproof member including an opening, and
   wherein the opening of the soundproof member is partially aligned with the first through-hole.

8. The electronic device of claim 7, wherein the opening of the soundproof member is connected with the first through-hole of the first fixing member and an opening of the microphone.

9. The electronic device of claim 1, wherein the recess is formed in an undercut shape.

10. The electronic device of claim 1, wherein the first fixing member includes a second opening into which at least part of the camera is inserted, a third opening larger than the second opening, and a seating surface forming a step between the second opening and the third opening, and
    wherein the glass window is disposed in the third opening and seated on the seating surface.

11. The electronic device of claim 10, wherein the glass window includes a transparent area through which an optical axis of the lens passes, and an opaque area formed at least partially circumferentially surrounding the transparent area, and
    wherein the opaque area is seated on the seating surface.

12. The electronic device of claim 1, further comprising:
    a rear case disposed in the housing, wherein the rear case extends between the second fixing member and the microphone,
    wherein the rear case includes a second through-hole aligned with the first through-hole, and
    wherein the microphone is aligned with the second through-hole.

13. The electronic device of claim 12, further comprising a soundproof member disposed between the second fixing member and the rear case, and
    wherein the soundproof member includes an opening connecting the first through-hole and the second through-hole.

14. The electronic device of claim 13, wherein the soundproof member is formed of an elastic material, and is disposed in a compressed state between the second fixing member and the rear case.

15. The electronic device of claim 13, wherein the soundproof member is disposed on one surface of the rear case and the microphone is disposed on the opposite surface of the rear case.

16. The electronic device of claim 1, wherein the first fixing member is connected to overlap the second fixing member in a direction of an optical axis of the lens.

17. The electronic device of claim 1, further comprising a printed circuit board disposed within the housing, and
    wherein the microphone is disposed on the printed circuit board.

18. The electronic device of claim 1, wherein the camera bracket is coupled to the cover, and
    wherein a microphone hole for audio input is defined by the recess and the first opening.

19. The electronic device of claim 1, further comprising an adhesive member attaching the second fixing member to the cover.

20. The electronic device of claim 19, wherein the adhesive member includes a double-sided tape.

\* \* \* \* \*